US008791898B2

(12) United States Patent
Rottler et al.

(10) Patent No.: US 8,791,898 B2
(45) Date of Patent: Jul. 29, 2014

(54) MOTION CONTROLLABLE DUAL DISPLAY PORTABLE MEDIA DEVICE

(75) Inventors: Benjamin A. Rottler, San Francisco, CA (US); Michael I. Ingrassia, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 545 days.

(21) Appl. No.: 12/690,330

(22) Filed: Jan. 20, 2010

(65) Prior Publication Data

US 2011/0175805 A1 Jul. 21, 2011

(51) Int. Cl.
*G09G 5/00* (2006.01)
*G06F 3/041* (2006.01)

(52) U.S. Cl.
USPC ............ 345/156; 345/173; 345/619; 345/649

(58) Field of Classification Search
None
See application file for complete search history.

(56) References Cited

U.S. PATENT DOCUMENTS 6,757,036 B1 6/2004 Dolezal et al.
7,142,195 B2 11/2006 Northway et al.
7,636,071 B2 12/2009 O'Gorman
2008/0316581 A1* 12/2008 Moriya et al. ................ 345/107
2009/0262080 A1* 10/2009 Northway et al. ............ 345/169
2009/0271381 A1* 10/2009 Beezer et al. ................. 715/781
2009/0300539 A1 12/2009 Hendricks
2010/0169367 A1* 7/2010 Lee et al. ...................... 715/863
2011/0102455 A1* 5/2011 Temple ......................... 345/156
2011/0157231 A1* 6/2011 Ye et al. ........................ 345/649

OTHER PUBLICATIONS

Chen et al., "Navigation Techniques for Dual-Display E-Book Readers," http://www.cs.umd.edu/~francois/Papers/EBookReaderCHI08.pdf, Apr. 2008.
Murph, "Entourage Edge e-reader shows off its softer-ware side on video," http://www.engadget.com/2009/12/07/entourage-edge-e-reader-shows-off-its-softer-ware..., posted Dec. 7, 2009.

* cited by examiner

*Primary Examiner* — Bipin Shalwala
*Assistant Examiner* — Ryan A Lubit
(74) *Attorney, Agent, or Firm* — David C. Kellogg

(57) ABSTRACT

Methods and apparatus of interaction with and control of a portable media device through applied motion. In the embodiments described herein, the portable media device can include at least two displays arranged such that only one can be presented at a time. The portable media device can be configured to operate as a electronic book (e-book) having at least one electrophoretic type display having a refresh time less than an amount of time to rotate the e-book to view the refreshed display.

14 Claims, 14 Drawing Sheets

{X,Y,Z} user co-ordinate system

MOTION CONTROLLABLE DUAL DISPLAY PORTABLE MEDIA DEVICE

TECHNICAL FIELD

The embodiments described herein relate generally to interactive operation of a portable media device, the portable media device having at least two displays only one of which can be presented at a time. More particularly, a method and an apparatus are described for using controlled motions to modify operations of the portable media device.

BACKGROUND

Portable media devices once solely used for playing back audio media such as MP3 files have advanced to the point where more recent portable media players have become adept at storing and displaying still images. In some cases, video can be downloaded and played back at a user's discretion. One area, however, that has lagged is the ability for portable media devices to provide a user with the ability to read relatively large amounts of text, such as that found in a book, magazine, and so on in an environment that provides a true book like experience. In an attempt to address this problem, various electronic books (also referred to as e-books) have been designed specifically for reading documents converted to electronic form. Many of these recently developed e-books utilize bi-stable display technologies (such as e-ink, e-paper, and so on) that do not require power to maintain an image on the screen. E-paper is capable of holding text and images indefinitely without drawing electricity while still allowing the image to be changed later.

Unfortunately, e-paper technologies have a very low refresh rate (on the order of about one second) compared with other low-power display technologies, such as liquid crystal displays (LCD). This slow refresh rate can severely and adversely impact user's overall reading experience. For example, once the user has finished reading a page of a document, the page must be refreshed in order to present another page of the document. The need to refresh in order to view a new page can be frustrating as it requires the reader to stop and wait for the new page to come into view.

Therefore, what is desired is a system, method, and apparatus for providing a user with an easy to operate portable device that can be configured as a electronic book that can provide the user with a true book like reading experience.

SUMMARY OF THE DESCRIBED EMBODIMENTS

It is an advantage of the presently described embodiments to provide a motion controllable dual display portable media device having at least a first and a second display mounted in a single housing in such a way that only one of the displays can be presented to a user at a time.

In one embodiment, a method for modifying an operation of a portable media device is described. The portable media device can take many forms, such as an electronic book. In any configuration, however, the portable media device includes at least a processor, a sensor, and at least a first display and a second display mounted in a single piece housing such that only one of the displays is presented at a time. The method can be carried out by performing at least the following operations: detecting if the portable media device is being rotated, determining an axis of rotation from at least three recognized axes of rotation and a direction of rotation, and modifying an operation of the portable media device based upon the determined axis of rotation and the direction of rotation.

In one aspect, when the portable media device is an electronic book, the modifying the operation can include updating visual content presented by a display not currently in view within an amount of time required to rotate the electronic book that brings the display into view of the user.

In another embodiment, an electronic book is disclosed. The electronic book can include at least a single piece housing, a plurality of displays where at least two of the plurality of displays are mounted back to back within the single piece housing such that only one of the at least two displays is presented to a user at a time, a processor incorporated into the housing and coupled to the plurality of displays, and a sensor coupled to the processor arranged to provide at least a signal to the processor indicative of at least a rotation of the electronic book where the rotation can be about at least three recognized axes of rotation. In the described embodiment, modification of an operation of the electronic book can be accomplished by rotating the electronic book about at least one of the at least three recognized axes of rotation in a first direction.

In yet another embodiment, computer readable medium for storing in tangible form computer instructions executable by a processor for modifying an operation of a portable media device is described. In the described embodiment, the portable media device includes at least the processor, a sensor arranged to sense at least a rotation of the portable media device about an axis of rotation. The portable media device further including at least a first display and a second display mounted in a single piece housing such that only one of the displays can be presented at a time. The computer readable medium includes at least computer code for detecting if the portable media device is being rotated, computer code for determining an axis of rotation from at least three recognized axes of rotation and a direction of rotation, and computer code for modifying an operation of the portable media device based upon the determined axis of rotation and the direction of rotation.

Other apparatuses, methods, features and advantages of the described embodiments will be or will become apparent to one with skill in the art upon examination of the following figures and detailed description. It is intended that all such additional systems, methods, features and advantages be included within this description be within the scope of and be protected by the accompanying claims.

BRIEF DESCRIPTION OF THE DRAWINGS

The described embodiments and the advantages thereof may best be understood by reference to the following description taken in conjunction with the accompanying drawings.

DETAILED DESCRIPTION OF EXAMPLE EMBODIMENTS

Figure 1:
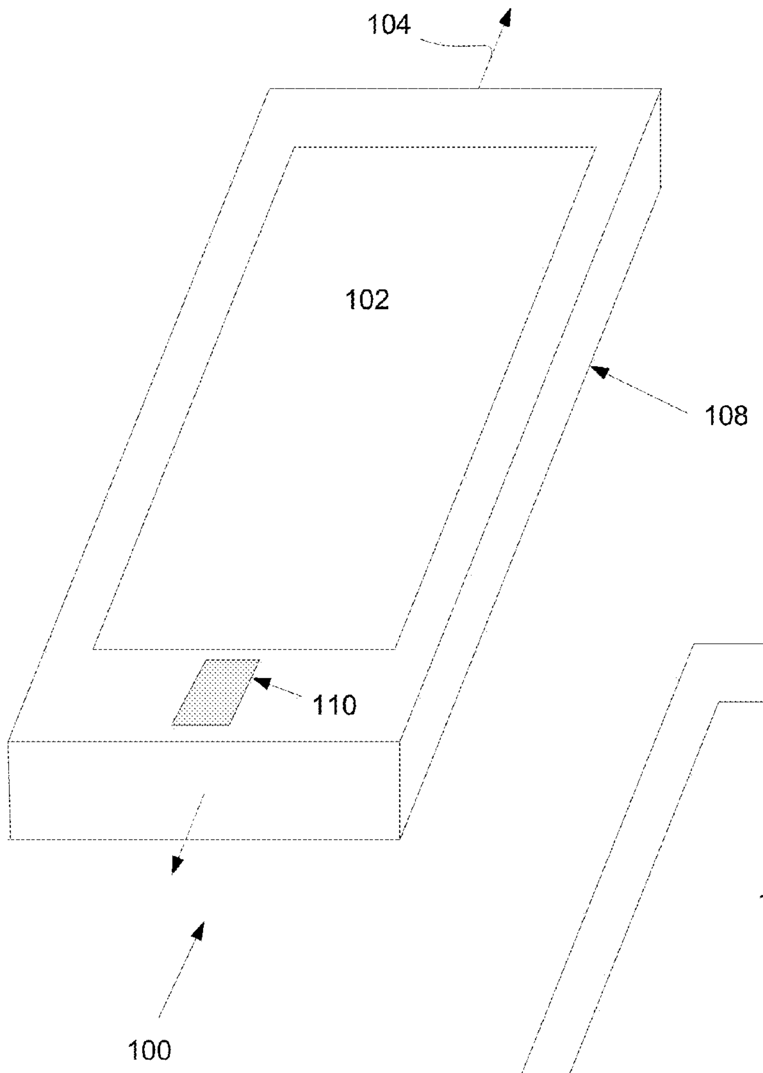
FIGS. 1 and 2 shows perspective views of representative dual display portable reading device in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper discusses interactive operation of a dual display portable media device having at least two displays mounted in a single piece housing in such a way that only one display can be presented to the user at a time. In one embodiment, the displays are mounted back to back in the single piece housing. It should be noted that in the context of this discussion, the display that can be viewed by the user is referred to as a primary display whereas the other display out of view of the user (at least temporarily) is referred to as a secondary display. Of course, this nomenclature only refers to the relative positions of the displays with regards to the user and does not in any way suggest characteristics of the displays themselves (other than a current position). By interactive operation it is meant that the user can modify an operating state of the portable media device or content presented by at least one of the displays by moving the portable media device in any number of pre-defined ways. For example, the secondary display can be instructed to alter any visual content currently displayed as a result of a controlled movement applied to the portable media device. The controlled movement can include, for example, rotating the portable media device around any one (or more) of at least three predefined rotational axes, or translating (in an accelerated or non-accelerated manner) the portable media device along any one.

In some embodiments, the portable media device can recognize rotational movement, translational movement (that includes linear acceleration) in accordance with a single coordinate axis. In other cases, however, the portable media device can recognize rotational movement, translational movement (that can also include linear acceleration) in accordance with more than a single co-ordinate axis. In this way, the user can move the portable media device in any way such that the device movement has components in a first direction and a second or even third direction. For example, the portable media device can be rotated such that the rotation can have (presuming a Cartesian co-ordinate system) an x rotational component and a y rotational component. Furthermore, the device can have in addition to the rotational components in (x,y) a z translational component or any combination thereof.

In addition to providing the ability to control the portable media device using both simple (components in a single co-ordinate axis) and compound movements (components in more than a single co-ordinate axis), the manner of control of the portable media device can depend upon a current operating state of the portable media device or a type of content currently being displayed by the portable media device. For example, if the portable media device is an electronic book (also referred to as a e-book) and a specific page of an identified book digitally stored in the e-book is being viewed at the primary display, then by rotating the e-book "end over end" (i.e., rotating about x axis of FIG. 4) the secondary display can be instructed to present a table of contents of the identified book to be viewed once the rotation has progressed far enough to bring the secondary display into view (where is now becomes the primary display). Moreover, if the initial conditions of the e-book are modified (such as selecting a word from the displayed page) prior to rotating, then rotating the e-book in the same manner as before would result not in the table of contents being displayed but a dictionary page presenting at least one definition of the selected word, or words.

A direction of rotation about a selected axis of rotation can be used to modify an operating state of the portable media device. For example, if as in the example presented above the user had rotated the e-book end over end but in an opposite direction (clock wise instead of counter-clockwise, for example), then instead of a table of contents being displayed, the secondary display could be instructed to present an annotation pad suitable for receiving user annotations or other comments that the user would like to associate with the particular page (or associated with a selected word, phrase, paragraph, etc. if selected by the user prior to the rotating). In addition to the physical actions carried out by the user, in some embodiments, the alteration of the operation of the e-book or the visual content being displayed can be context sensitive. By context sensitive, it is meant that the alteration of the operation of the e-book or visual content being displayed can depend upon the type of content being presented on the primary display as well as the content itself. For example, if the content being presented on the primary display is a page from a book, then rotating the e-book end over end in a first direction can cause a table of contents to be displayed. However, if the content being displayed is a magazine article, using the book protocol (i.e., showing the table of contents) would likely be of little interest at that moment to the user. However, in accordance with a magazine protocol, rotating the e-book end over end in the first direction can cause a list of related articles in that magazine or other magazines to be displayed when the rotation is substantially completed. Moreover, if the content being displayed is a tree, for example, then any modification of the operation the e-book (or more generally the dual sided portable media device) can be related to the fact that the tree is being displayed.

Context can also extend to the language of the material being presented to the user. For example, the language being presented to the user may require reading from left to right, or right to left, or up to down, and so on. In this way, the e-book can automatically determine the language in which the data is being presented (or it can be manually provided) and the operation of the e-book and be modified accordingly.

It should be noted that the ability of the portable media device to consider the context of the material being presented is not limited to textual data such as that presented by an e-book. On the contrary, the context of the material being presented can also be extended to non-textual data. For example, if data consistent with an electronic version of a book (such as text or graphics data) is being presented, then the portable media device can be configured to operate as an e-book. On the other hand, if the type of data currently being (or to be) presented is image data, such as a JPEG image, then the portable media device can be configured to operate as an image viewer. In this way, the responses of the portable media device to controlled movements supplied by the user can be can be predicated upon the context dependent configuration of the portable media device. (e-book, image viewer and so on).

It should be noted that in some embodiments, the operation of the portable media device can be modified using a set of default conditions preset by the manufacturer of the portable media device. However, it is contemplated that at the discretion of the user, the relationship between a particular user action (such as rotating the device or providing a user input, for example) and any modification of the operation of the portable media device can be set by the user either in whole or part, and reset to a default state if so desired. Furthermore, when operating as an e-book, language recognition can be provided that can alter response of the e-book to movement provided by the user. For example, some languages are read right to left, whereas others are read left to right whereas still others are read up to down.

These and other embodiments are discussed below with reference to FIGS. 1-20. However, those skilled in the art will readily appreciate that the detailed description given herein with respect to these figures is for explanatory purposes only and should not be construed as limiting.

Figure 2:
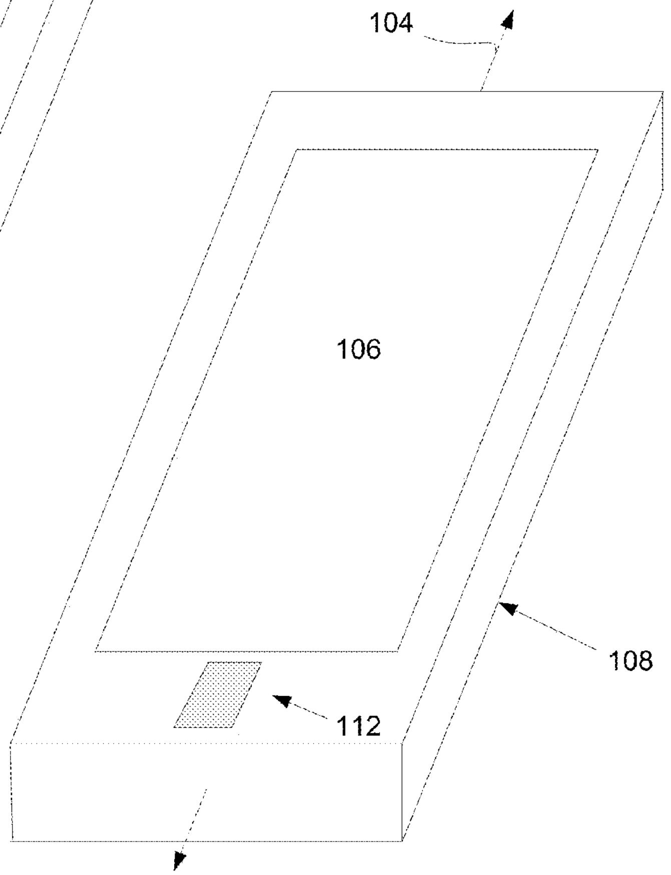

FIGS. 1 and 2 show perspective views of representative dual display portable media device 100 in accordance with the described embodiments. In particular, FIG. 1 shows a first side of portable media device 100 that can include at least display 102 whereas FIG. 2 shows portable media device 100 rotated about 180° about axis 104 to reveal second display 106. In the described embodiment, first display 102 and second display 106 can be mounted back to back and be enclosed within single piece housing 108. In this way only either first display 102 or second display 104 can be viewed by a user at a time. Portable media device 100 can include control feature 110 on the first side of portable media device 100 and control feature 112 on the second side of portable media device 100. Control features 110 and 112 can represent a mechanism for providing specific control signals to portable media device 100. Control features 110 and 112 can include, for example, a volume control, a power button, a mute control, and so on. In some cases, either one or both of displays 102 and 106 can be touch sensitive in that the user can provide control signals to portable media device 100 by merely touching displays 102 or 106 in appropriate locations and/or with appropriate gestures. It should be noted that not all embodiments of the portable media device are as symmetrically configured as that shown in FIG. 1. In some cases, the first side of portable media device 100 can have either more or fewer control features than does the second side, and vice versa. In any case, the only requirement is that portable media device 100 can have at least two displays mounted in such a way that the user can be presented with only one display at a time.

Portable media device 100 can take many forms. In one embodiment, portable media device 100 can take the form of electronic book (e-book) 100 suitable for storing a number of digitized books, magazines, articles, and so on. As is well known to those skilled in the art, e-book 100 can present visual content (typically textual in nature, but in some cases, graphical content can also be display in whole or in part) using any of a number of display technologies. One of the most common display technologies used for e-book applications rely on bi-stable display elements found in electrophoretic displays also referred to as electronic ink (or e-ink) or electronic paper. However, one disadvantage when using standard electrophoretic displays is that the refresh rate is quite slow, on the order of about one second. Therefore, any configuration of portable media device 100 that utilizes electrophoretic display technology must take into consideration the slow refresh time. For example, when portable media device 100 is configured to operate as an e-book having electrophoretic displays, any updating of the visual content presented by the secondary display must occur in an amount of time $t_1$ (total of display refresh time and operational delay time) that is less than an amount of time $t_2$ for the secondary display to become the primary display (i.e., the time to actually rotate the e-book about an axis by about 180°).

Figure 3:
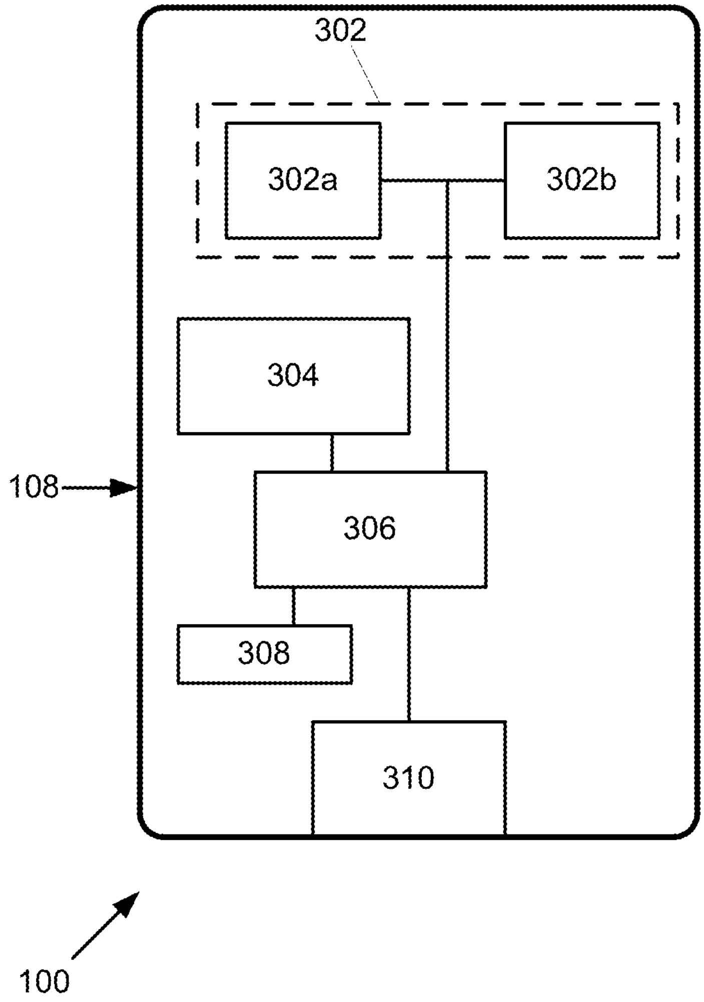
FIG. 3 shows representative operational circuitry adapted for use in the dual display portable reading device shown in FIGS. 1 and 2.

Portable media device 100 can include a number of operational components as illustrated in simplified form in FIG. 3. Single piece housing 108 can enclose and support video output circuits 302 (302*a* can control first display 102 and 302*b* can control second display 106, for example), data storage device 304, processor 306, multiple function sensor 308, and user input interface 310. It should be noted that even though only a limited set of components are shown this does not imply a limitation on the functional components that can be included in portable media device 100. For example, in addition to the components shown in FIG. 3, embodiments of portable media device 100 can also include a power connector, a data transfer component, a wireless telecommunications interface, voice recognition circuits, audio circuits and so on.

Portable media device 100 can include storage unit 304 arranged to store data. The stored data can include media data in the form of, for example, audio data, textual data, graphical data, image data, video data and multimedia data typically in the form of data files. The stored data files can be encoded either before or after being stored using a variety of compression algorithms. For example, audio data can be compressed using MP3, AAC and Apple Lossless compression protocols whereas images can be compressed using, JPEG, TIFF and PNG compression. Moreover, video data can be compressed using H.264, MPEG-2 and MPEG-4 and so on. The stored media contained in the storage unit 304 can be accessed by processor unit 306 that can search and retrieve the stored media for reproduction to a user of portable media device 100.

Figure 4:
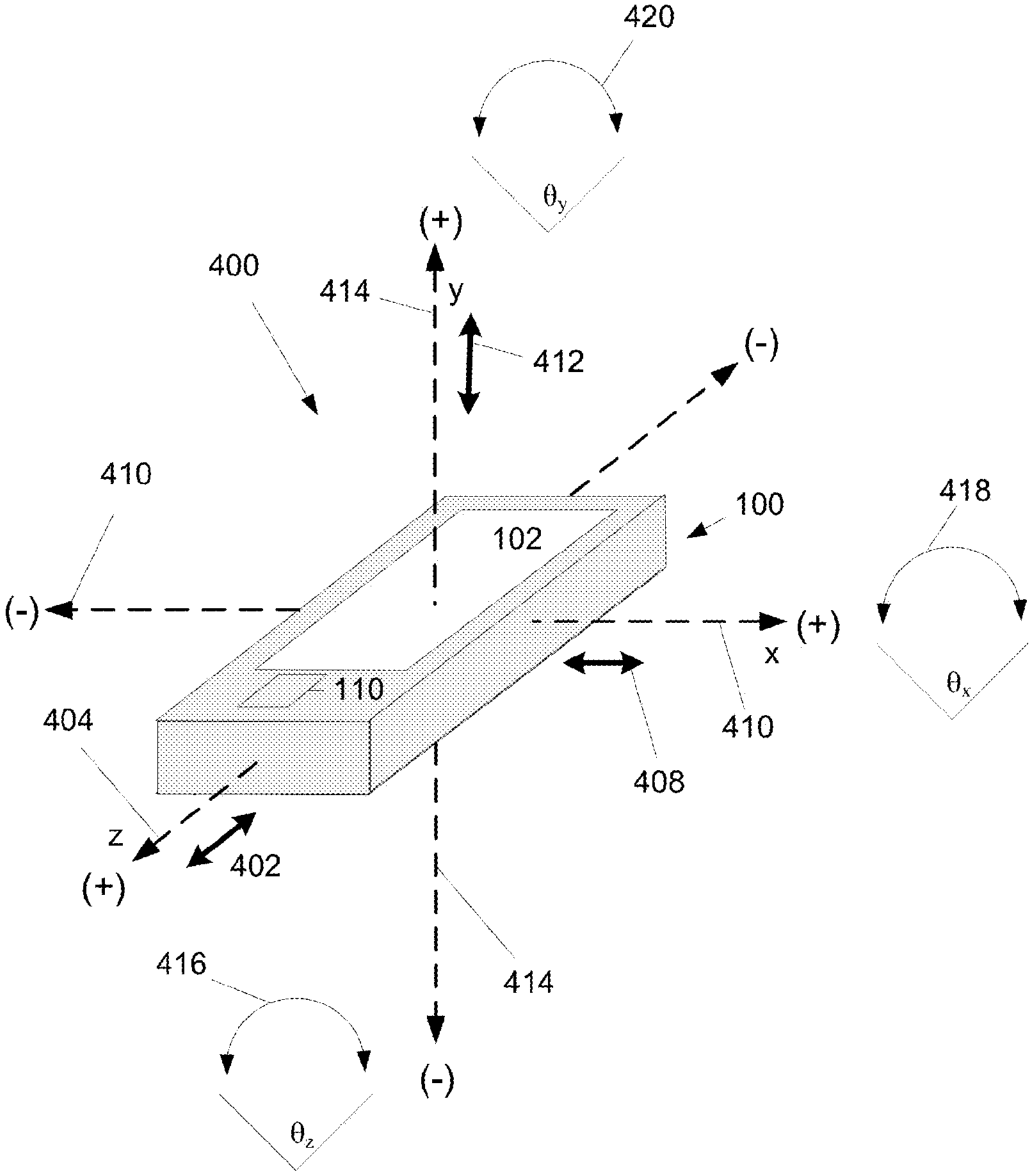
FIG. 4 illustrates device-centric co-ordinate system with the portable media device at the origin {0,0,0}.

Portable media device 100 can include sensor 308 that can function as, without limitation, an accelerometer, a gyroscope or another motion and or acceleration sensing device. Sensor 308 can detect at least a change in position, orientation or movement of portable media device 100. Typically, accelerometers can measure linear motion and accelerated linear motion directly, while gyroscopes can measure angular motion and angular acceleration directly. In some embodiments, sensor 308 can provide geographical location services to processor 306 along the lines of, for example, GPS, cellular phone location services, and so on. Sensor 308 can detect changes in position, orientation or movement, and acceleration along a number of different reference directions, singly or in combination, as shown in FIG. 4 illustrating device-centric co-ordinate system 400 with portable media device 100 at the origin {0,0,0}. In this way, sensor 308 can detect (in any combination) linear translational motion 402 along z-axis 404, linear translational motion 408 along x-axis 410, and linear translational motion 412 along a y-axis 414. Moreover, sensor 308 can detect rotational movement 416 and angular displacement $\theta_z$ about z axis 404, rotational movement 418 and angular displacement $\theta_x$ about x axis 410, and rotational movement 420 and angular displacement $\theta_y$ about y axis 414. Based on the orientation of the portable media device 400 in FIG. 4, translational movement along the x-axis can be associated with right/left motion, movement along the y-axis with up/down motion, and movement along the z-axis with front/back or forward/reverse motion.

In certain embodiments, sensor 308 can be limited to sense only a subset of the possible dimensions or motions to lower its complexity or cost. For example processor 306 can be configured to process rotational signals and ignore linear translation signals, or in some embodiments, sensor 308 itself can be configured to only react to rotational type movements. For example, in the case where portable media device 100 takes the form of e-book 100, then sensor 308 can be configured to only react to rotational motions about the {x,y,z} axes and ignore any linear translational inputs. This simplification can make sense since it would be more appropriate for an e-book to mimic a traditional book that opens right to left (or left to right). In some cases, if portable media device 100 is sensed to be at rest on a flat surface such as a desk or table, then sensor 308 can only provide input data to processor 306 related to rotational data about the unconstrained axis. For example, referring to FIG. 4, if portable media device 100 is placed on table (as an xy plane), then the only rotational component possible for portable media device 100 is a z rotational component. Therefore, in this situation, sensor 308 can disable any sensing circuits not designed to sense the z rotational component in order to, for example, save power.

Figure 5:
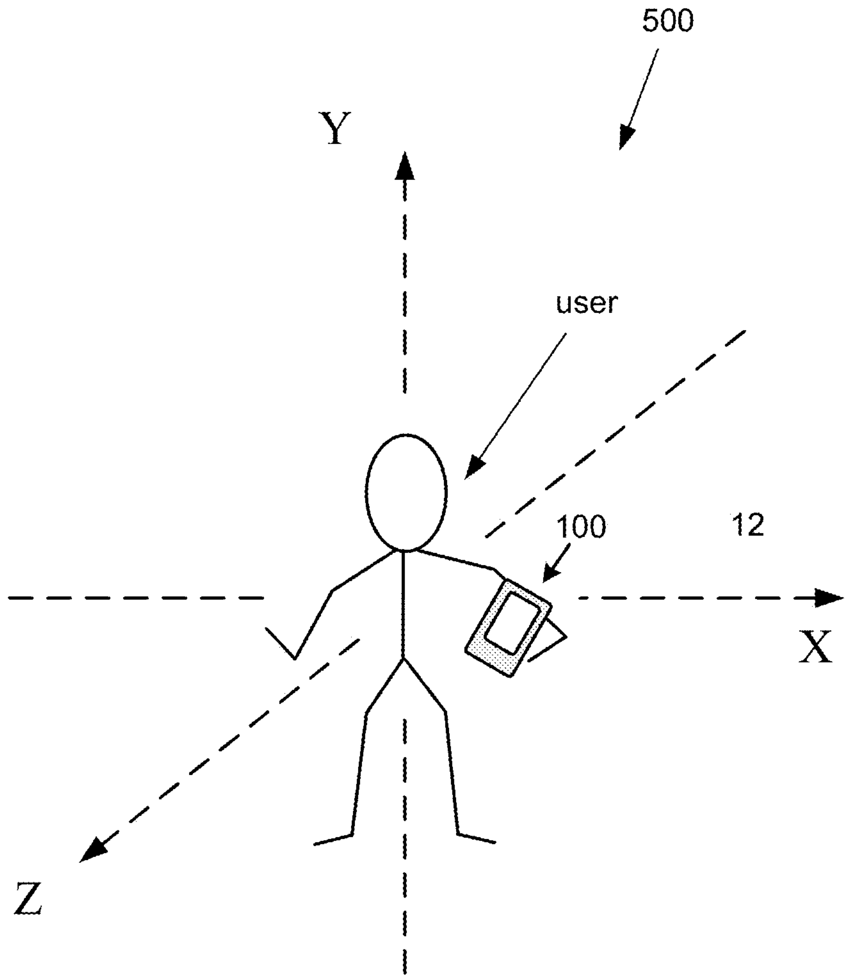
FIG. 5 shows a user centric co-ordinate system with a user holding a dual display portable media device shown in FIGS. 1 and 2.

FIG. 5 illustrates user-centric co-ordinate system {X,Y, Z}having a user positioned at the origin, the user holding portable media device 100 in one hand. Portable media device 100 can be suitably configured in both size and weight to be easily carried in one hand by the user such that portable media device 100 can be easily moved about in any manner in any of the three spatial device co-ordinates. Accordingly, due to the ease of movement, in order for portable media device 100 (in particular processor 306) to correctly interpret only motion or acceleration applied by the user directly to portable media device 100 in device-centric co-ordinate system 400, processor 308 must be able to distinguish motion or acceleration of the user in the user-centric co-ordinate system {X,Y,Z} from motion or acceleration applied by the user to portable media device 100. For example, if the user is moving/accelerating in relation to the user-centric co-ordinate system {X,Y,Z}, processor 306 must be able to comprehend and distinguish this motion/acceleration when interpreting the signals received from sensor 308 (which responds to both user centric and device centric acceleration/movement). As part of this distinguishing, processor 306 can filter spurious and random or quasi-random motion and acceleration (such as from jostling) from more deliberate motion or acceleration applied by the user to portable media device 100.

As part of this filtering and distinguishing, processor 306 can determine if an angle of rotation of portable media device is greater than a critical angle of rotation. In this way, if the angle of rotation must equal or exceed the critical angle of rotation in order for processor 306 to consider the rotation sensed by sensor 308 as being provided by the user in a deliberate manner. It should be noted that the critical angle can be modified based upon any number of external factors, such as a user orientation in the user centric co-ordinate system, historical data related to user movements, etc. Only in those situations where the sensed angle of rotation is greater than the critical angle of rotation will processor 306 issue instructions to portable media device 100, otherwise, the presumption is the rotation was inadvertent and no instructions are issued. In some cases, however, the processor 306 can instruct portable media device 100 to send an indication to the user to confirm if the rotation was deliberate or not.

In some embodiments, processor 306 can issue instructions even in those cases where the angle of rotation is not greater than the critical angle. This situation can arise when, for example, portable media device 100 can operate in what can be referred to as a flip or flick mode. By flick mode it is meant that by quickly moving portable media device 100 up (or down) in short motions (similar to flicking or flipping pages), processor 306 can issue flip instructions. For example, if portable media device 100 is presenting images (such as a slide show), the user can quickly advance (or regress) through the images by flicking portable media device 100 at quick enough rate that the angular velocity of portable media device 100 is greater than a threshold value associated with the flick mode. Moreover, if portable media device 100 is an e-book, the flick mode can enable the user to quick flick through pages of the book, either forward or backward depending upon the direction of rotation, for example. In some cases, since the user is not fully rotating portable media device 100, an indicator can be presented on the primary display showing the advancing (or regressing) images or pages by either showing thumbnails, image numbers, page numbers and so on. Once the desired image or page has been reached, the user merely has to complete the rotation to view the image or page on what is now the primary display.

It may be advantageous to be able to distinguish the user's orientation in user-centric co-ordinate system {X,Y,Z}. For example, if the user is in a reclining position, then processor 306 can modify instructions to portable media device 100 accordingly. For example, in those embodiments where portable media device 100 takes the form of e-book 100, and it is determined that the user is reclining or lying down, then images presented by display 102 or 104 can be modified to take the current user orientation into consideration when displaying text or graphics. Furthermore, the orientation of the user can be used to modify how processor 306 filters signals presented to it by sensor 308. For example, if it is determined that the user in reclining, then the critical angle used to determine if a rotation is deliberate or not can be modified accordingly.

Figure 6:
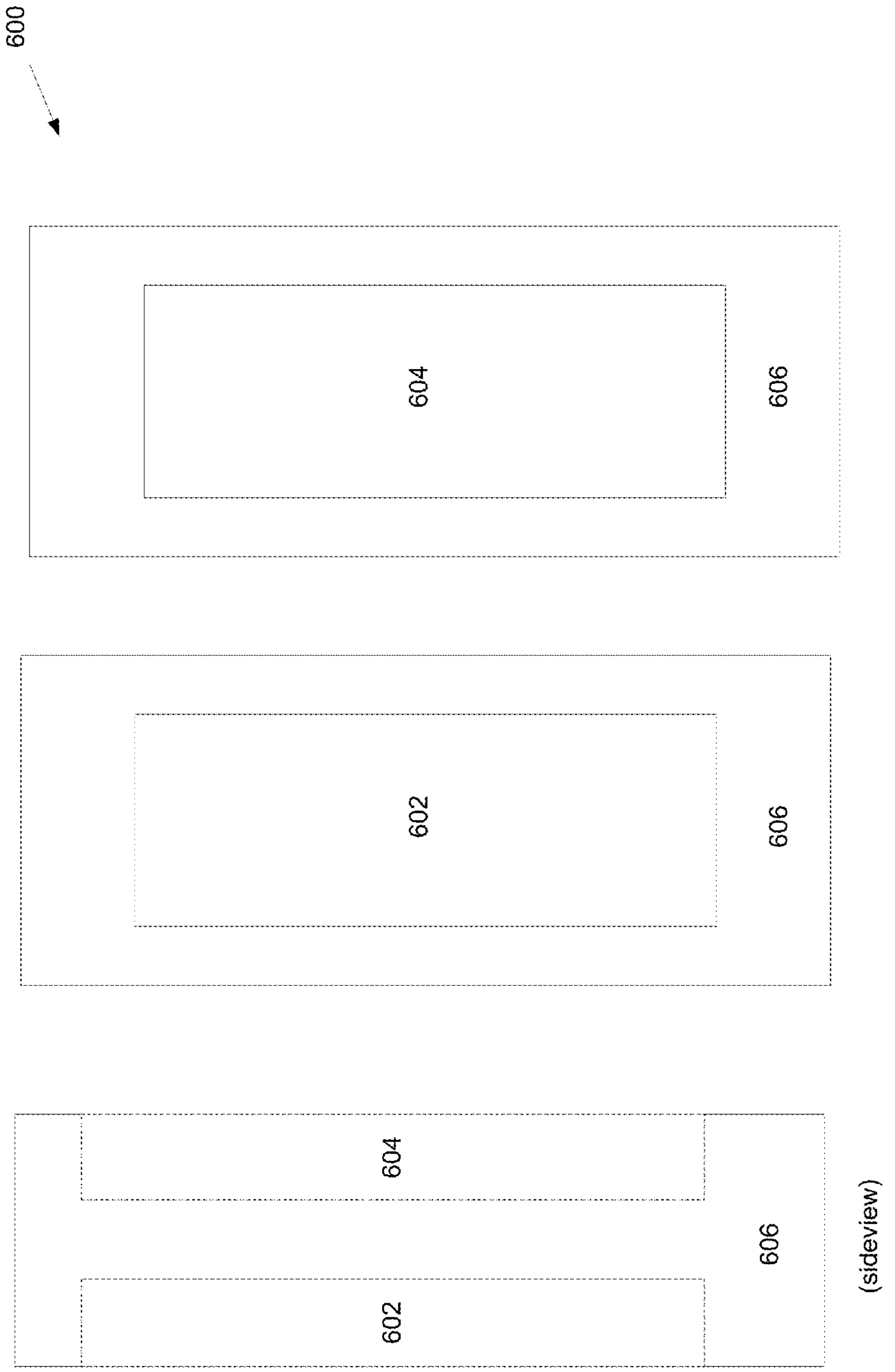
FIG. 6 shows a representative motion controllable dual display electronic book (e-book) in accordance with the described embodiments.

For the remainder of this discussion, portable media device 100 is presumed to take the form of dual display e-book 600 as shown in FIG. 6 without any loss of generality. Accordingly, e-book 600 can include at least two displays 602 and 604 mounted back to back in single piece housing 606. Displays 602 and 604 can be electrophoretic type displays where text/graphics are presented using e-ink. Other display technology can be used without any loss of generality. As discussed above, one of the disadvantages of e-ink is the relatively long refresh time required to update displayed content. Therefore, again for simplicity, it is presumed that the time $t_1$ (i.e., the time to refresh the displayed content and the operational delay) is substantially less than time $t_2$ (amount of time required to turn e-book approximately 180°).

It should be noted that the mapping of movements of e-book 600 and any possible gestures applied by the user as an intended modification of operating state of e-book 600 can be "many to one," i.e. a single movement can be used to indicate the several different operating states depending upon a number of factors other than the movement of e-book 600. as illustrated in FIGS. 7-17. It should be noted, however, that the examples presented are merely demonstrative and should not in any way be construed as limiting to only the examples shown. It should also be noted that the choices of axes for rotation and directions of rotation are again for illustrative purposes only and should not be considered limiting in any way since any axis and direction of rotation can be customized by the user as desired.

Figures 7, 8:
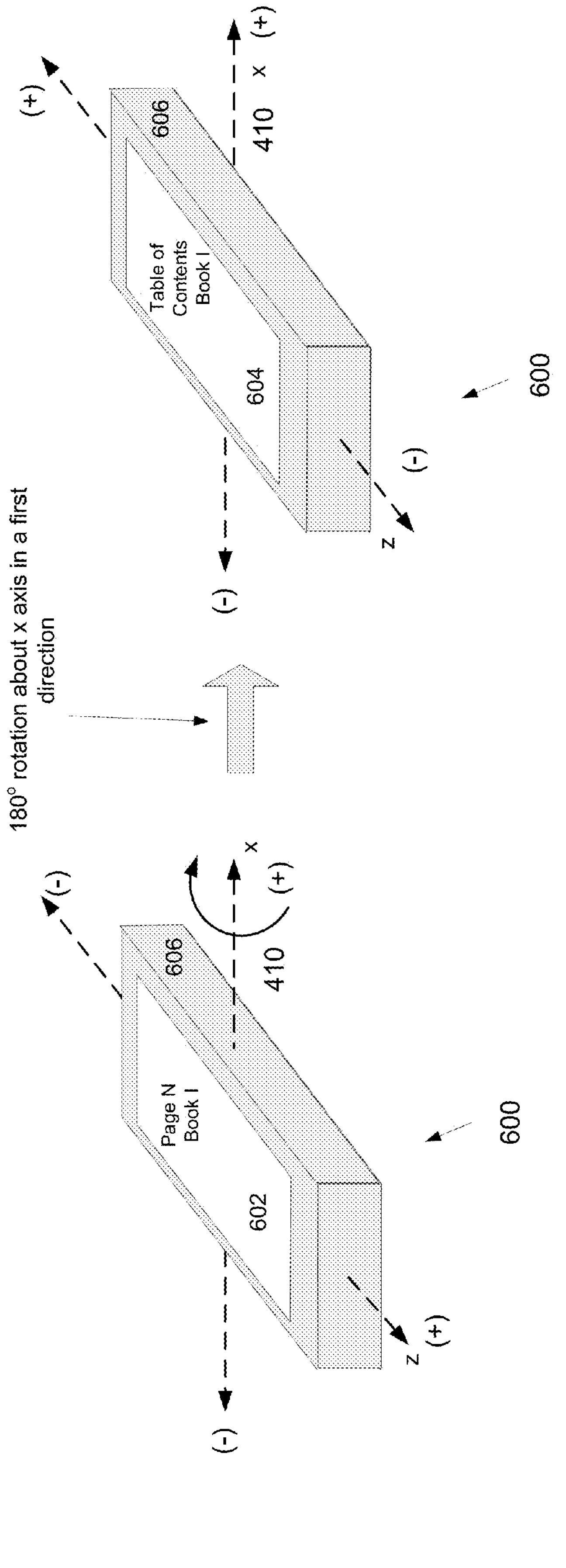
FIGS. 7-17 show representative modes of operation of motion controllable dual display e-book in accordance with the described embodiments.

FIG. 7 shows display 602 presenting a current page N of a book I (stored in storage device 304). The user can modify the operating state of e-book 600 in any of a number of ways. For example, the user can rotate e-book 600 about an axis of rotation selected from at least three recognized axes of rotation where the selected axis of rotation determines, at least in part, a manner in which the operating state of e-book 600 is modified. If, as shown in FIG. 7, the user selects x axis 410 as the axis of rotation and rotates e-book 600 more than the critical angle $\theta_{crit}$ in a first direction (which for this example can be clockwise), processor 306 can instruct the appropriate operational components in e-book 600 to update visual content presented by display 604 as shown in FIG. 8. In one embodiment, the updated visual content presented by display 604 as a result of the rotation can be a table of contents for Book I. Of course, the updated visual content can be any content related to Book I as a whole (such as the table of contents) or content related specifically to Page N, or in some cases an entirely different page such as a next page (i.e., Page N+1) or a previous page (Page N−1). In any case, the manner in which the operation of e-book 600 is modified (or more specifically in these examples, the updating of the displayed visual content), can be chosen by the user or left to default values pre-selected by the manufacturer of e-book 600.

Figures 9, 10:
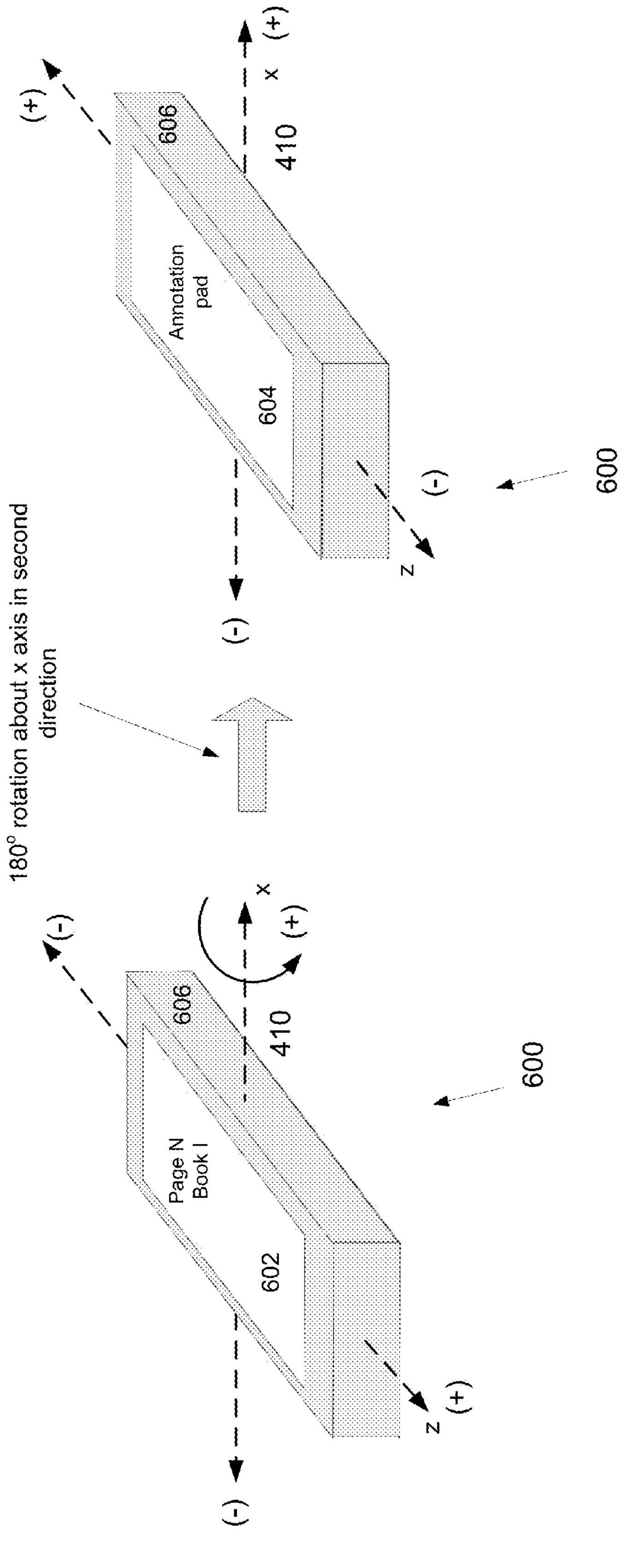

FIGS. 9 and 10 show how the result of rotation about x axis can be modified simply by choosing to rotate e-book 600 in a second direction (in this case, counter-clockwise) different from the first direction shown in FIG. 7. In this case, instead of presenting the table of contents for Book I, FIG. 10 shows display 604 presenting an interactive annotation pad in which the user can input information such as notes or other comments which may or may not be related to page N or even Book I.

Figures 11, 12:
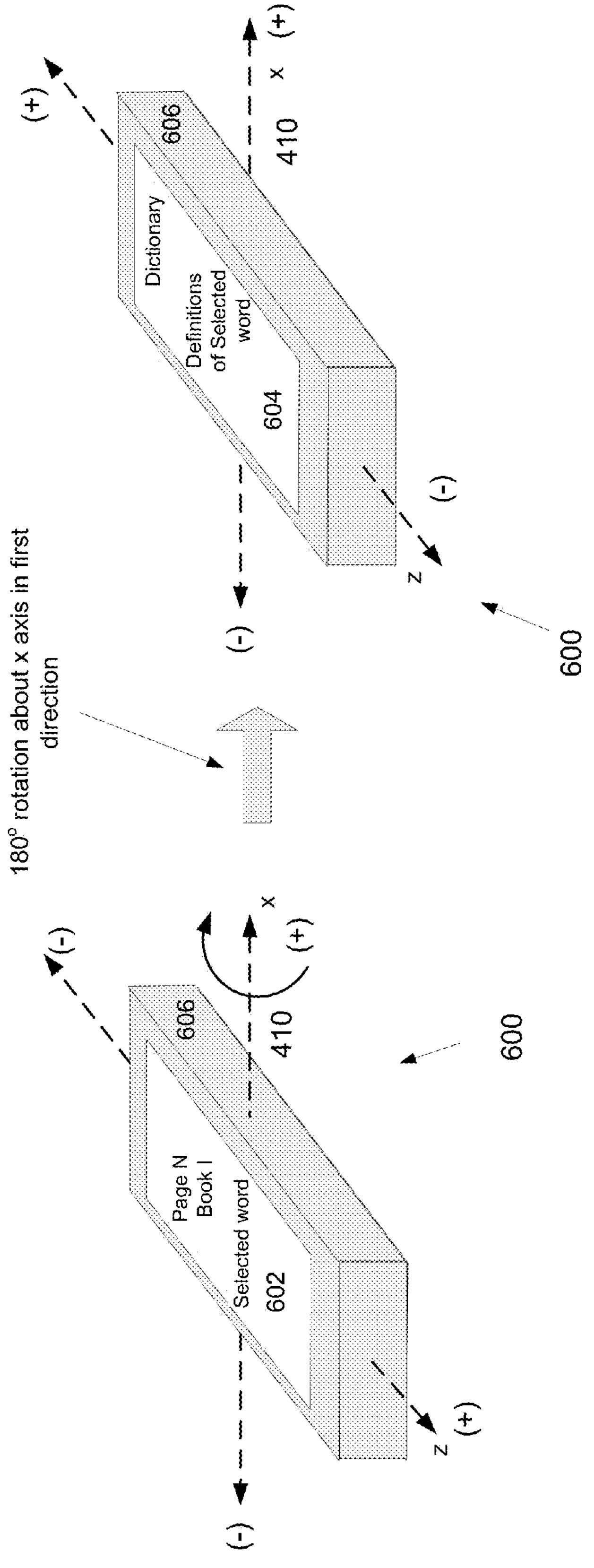
Figure 14:
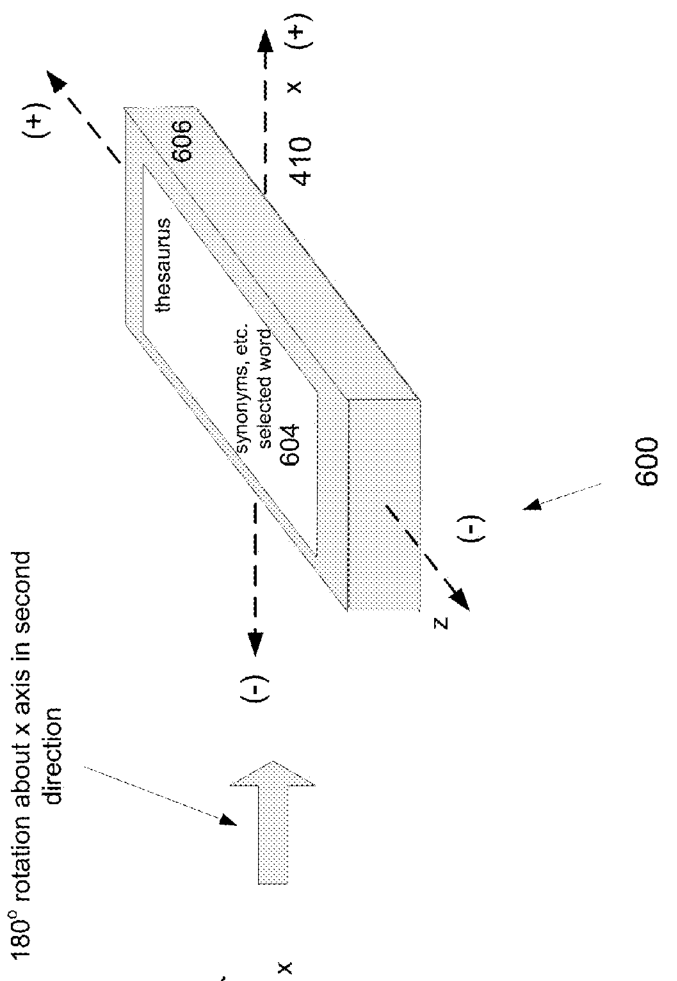
Figure 13:
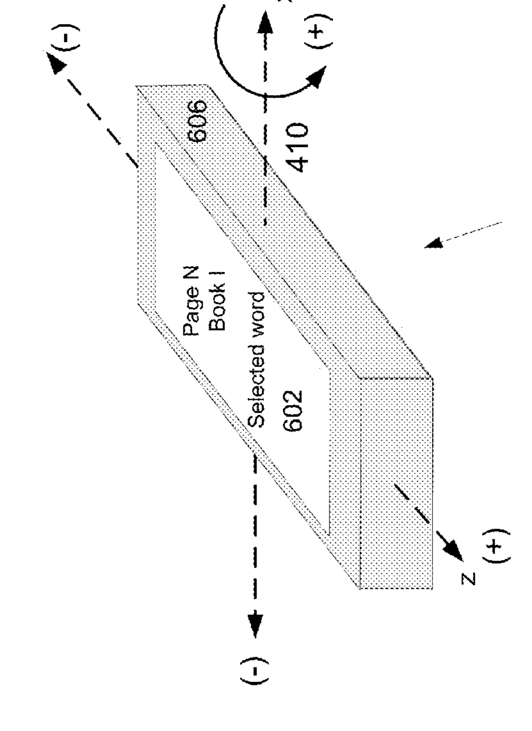

FIGS. 11 and 12 illustrates that providing a user input prior to the rotation about an axis can dramatically affect the post rotation state of e-book 600. Again using the example of FIG. 7 where Page N of Book I is presented by display 602, in this case, however, the user has selected a word (or phrase, or sentence) from Page N. Once the user has selected the word, the user can then rotate about x axis 410. In this example, the post rotation state of e-book 600 is the displaying of a dictionary page having a definition(s) of the selected word or phrase as shown in FIG. 12. Moreover, if instead of rotating e-book 600 about x axis 410 in the first direction, e-book 600 is rotated about x axis 410 in the second direction (counter-clockwise) as shown in FIG. 13, then instead of the post rotational state of a dictionary page being presented by display 604, the new post rotational state is that of a thesaurus being presented by display 604 listing a number of synonyms, antonyms, and so on for the selected word.

Figures 15, 16:
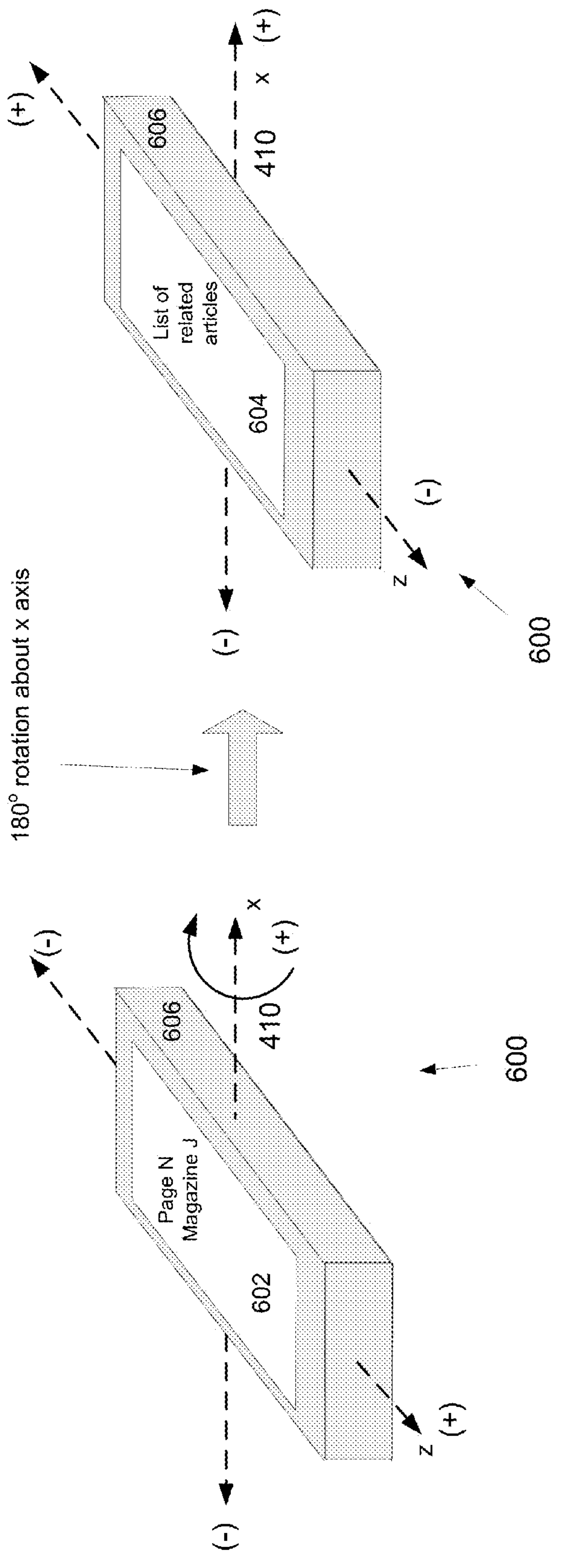

FIGS. 15 and 16 illustrates how the post rotational state of e-book 600 is affected when a document type being displayed by e-book 600 is taken into consideration. Using the same initial conditions as presented in FIG. 7 but with book I Page N being replaced by Magazine J Page N. In this situation, the document type (i.e., magazine) is taken into consideration when a determination is made of the post rotational state of e-book 600. Since it may not make much sense to present the user with a the table of contents for a magazine having a number of different articles since many of which may not be related at all to the current article being presented. It may make more sense to present information related to the article of which Page N is part. Therefore, when the user rotates e-book 600 about x axis 410 in the first direction, then a list of related articles can be presented by display 604.

Figure 17:
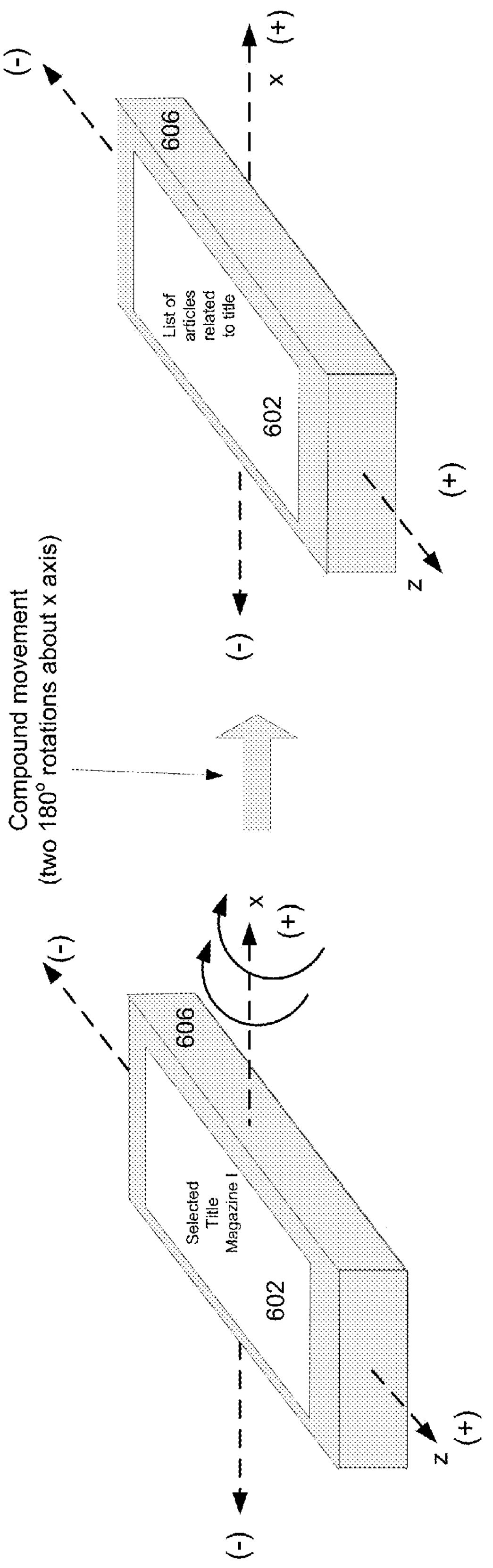

All of the examples described above have relied upon simple movements to modify the operating state of e-book 600. However, in some embodiments it may be advantageous to define a compound movement as one that can be used to modify the operation of e-book 600. For example, as shown in FIG. 17, a compound movement can be one in which e-book 600 can be rotated about x axis in the first direction twice (or the first direction once quickly followed by a rotation in the second direction) in quick succession. The result of the compound movement can be defined as appropriate. For example, if the double rotation compound movement is applied to e-book 600 when a title of a magazine article is presented on display 602, the double rotation compound movement can cause e-book 600 to present a list of magazine articles related to the subject corresponding to the selected title.

Figure 18:
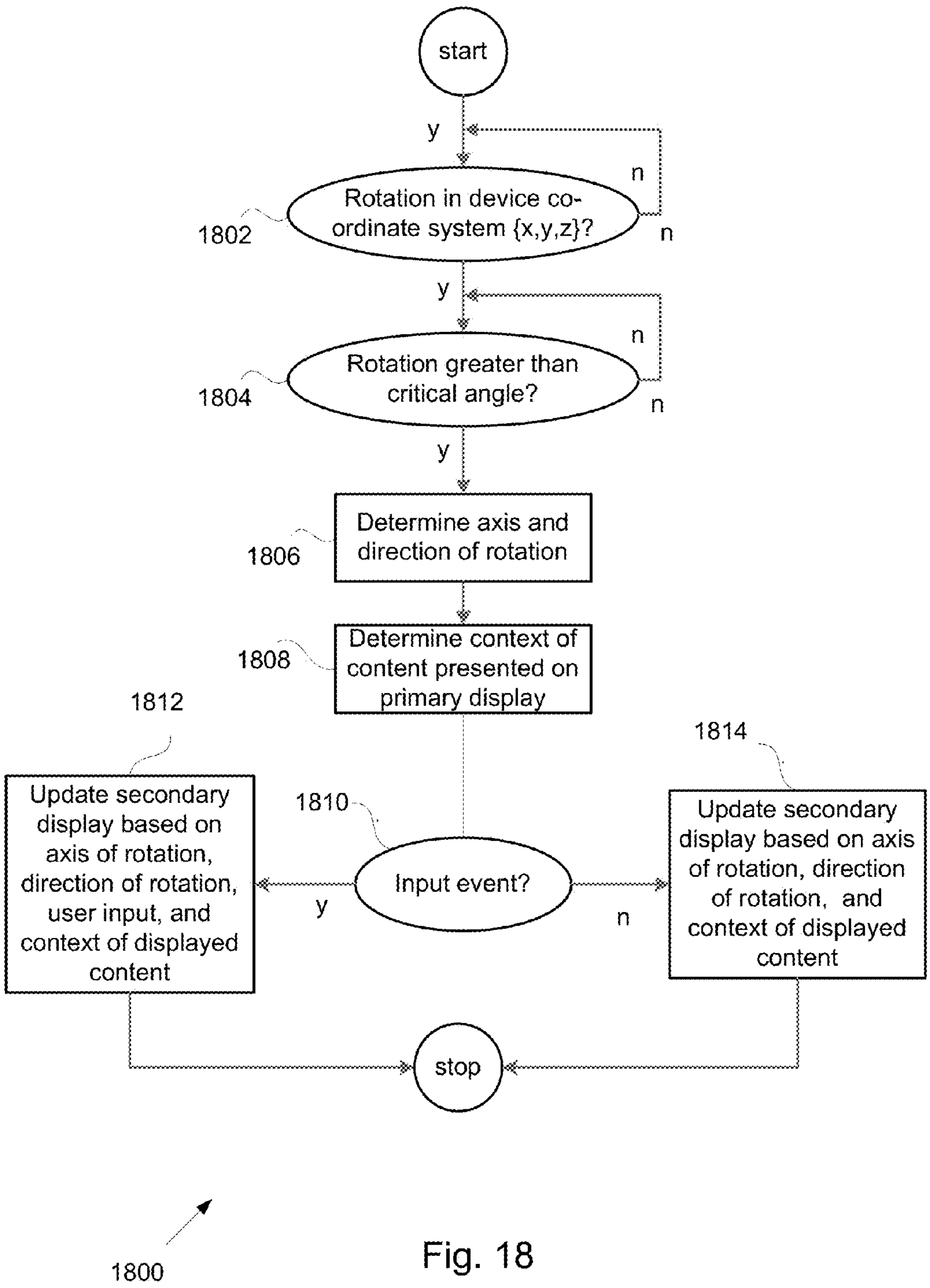
FIG. 18 shows a flow diagram describing a process in accordance with the described embodiments.

FIG. 18 shows a flow diagram of process 1800 executed by a processor in a dual display portable media device (that can include an e-book) in accordance with the described embodiments. In some embodiments, a determination can be made of the location of the portable media device in a user's co-ordinate space such that the processor can deduce from a signal (that can include a signal related to motion of the user in the user's co-ordinate space and a motion signal of the dual display portable media device in the device's co-ordinate space) provided by a sensor in the portable media device. In addition, the spatial location information can provide information related to the relative position of the user and portable media device (i.e., standing vs. reclining) which can be used by the processor to modify the operation of the portable media device. Once the location of the portable media device in the user co-ordinate system is established (it should be noted that this determination goes on continuously typically in the background), When visual content is displayed (or is scheduled to be displayed) on a primary display, since the displays are mounted in such a way that only one of the two displays can be presented to the user at a time, any visual content presented by the secondary display cannot be readily viewed and as such, the secondary display may not actually be displaying any visual content, in order to preserve power (especially when the portable media device is operating in battery mode). In some embodiments, the secondary display can be put in sleep or inactive mode having no displayed content until such time as the processor awakens the display in order to provide updated visual content in accordance with the applied movement of the portable media device.

In any case, process 1800 begins at 1802 where a determination is made whether or not the portable media device is being rotated about an axis of rotation in the device coordinate system. It should be noted that due to user handling inaccuracy, the processor may provide a manual indication to the user requesting confirmation that the portable media device is being deliberately rotated by the user. This determination can be especially important if, as in 1804, it is determined that an angle of rotation of the portable media device is not greater than a critical angle. By not exceeding the critical angle of rotation, it can be presumed that the detected rotation is not deliberate but merely the result of inadvertent movement by the user, caused by for example, jostling the portable media device, the user running or walking briskly, and so on. At 1804, if it is determined that the angle of rotation is greater than the critical angle of rotation, then at 1806, the axis of rotation and the direction of rotation is determined from at least three recognized axes of rotation. Once the axis of rotation and direction of rotation is determined, if at 1808 it is determined at the user has provided a user input to the portable media device, then the process proceeds to 1808, otherwise to 1810.

Turning first to 1808, when the user has applied a user input to the portable media device prior to the rotating, then the visual content presented by the secondary display is updated based upon the axis of rotation, the direction of rotation and the user input. It should be noted that this updating occurs prior to the completion of the rotation of the portable media device at which time the updated visual content is presented by what is now the primary display.

On the other hand, if there had not been a user input prior to the rotating, then at 1810, then the visual content presented by the secondary display is updated based upon the axis of rotation and the direction of rotation. It should be noted that there are many other factors in addition to whether or not the user has applied an input that can modify the updating of the visual content. For example, the type of visual content being displayed can affect the manner in which the visual content on the secondary display is updated.

Figure 19:
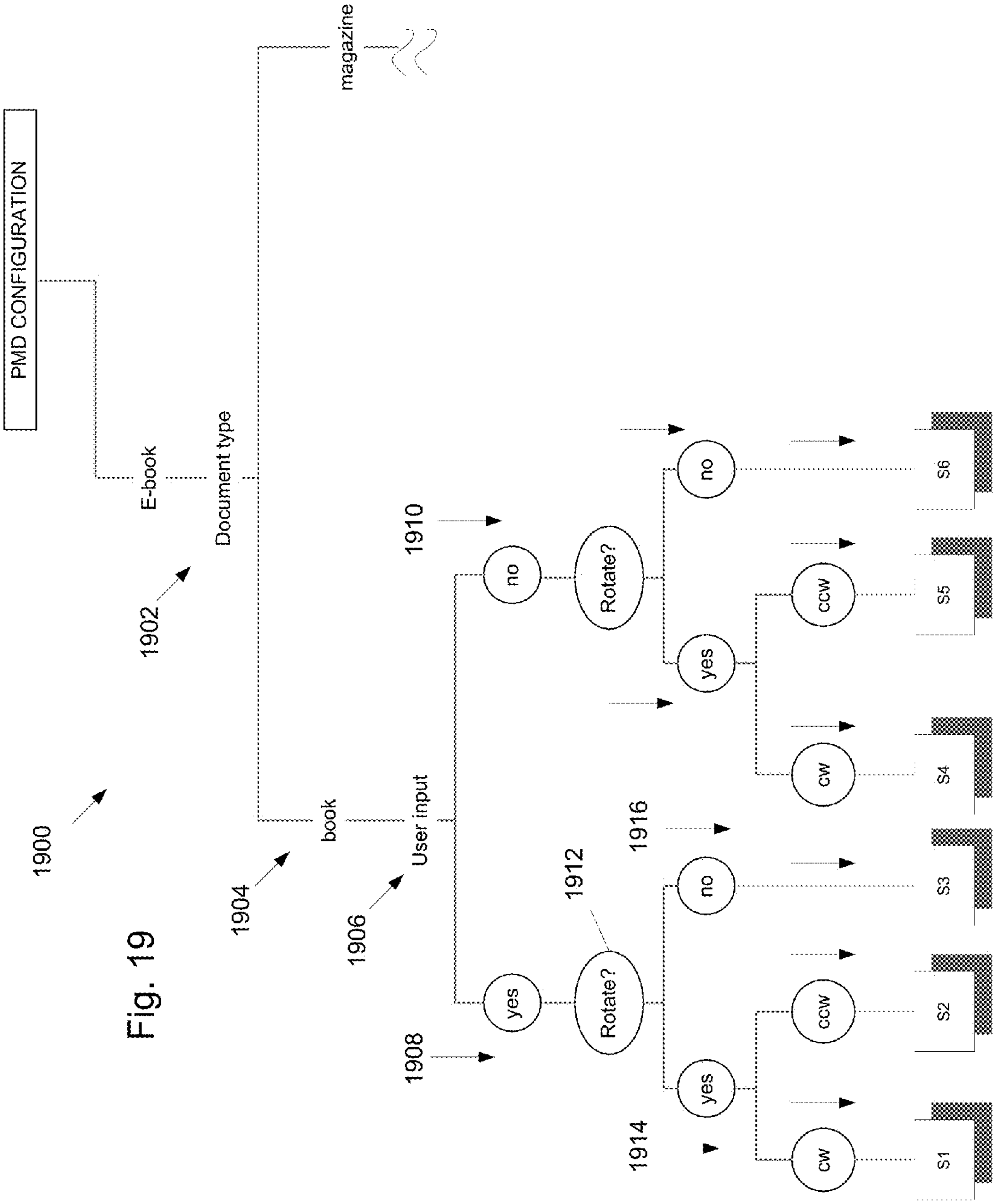
FIG. 19 shows representative state diagram for portable media device configured as an electronic book in accordance with the described embodiments.

FIG. 19 shows representative state tree diagram 1900 for portable media device 100 configured as an electronic book (e-book) 100 in accordance with the described embodiments. E-book 100 can provide the user a number of optional end states (S) each of which can be path dependent. For example, starting at the top of state tree diagram 1900, when the portable media device (PMD) is configured to operate as e-book 100, the type of document being presented to the user can be determined at 1902. If, for example, the document type is determined to be a book at 1904, then whether or not a user input is applied at 1906 will determine which branch, 1908 or 1910, is followed. If, in this case, a user input is applied, then branch 1908 is followed, otherwise branch 1910 is followed. Assuming for the moment that a user input is applied, then on branch 1908, whether or not e-book 100 is rotated at 1912, will determine which branch 1914 or 1916 is followed. If e-book 100 is rotated then branch 1914 is followed that can lead to either state S1 or S2, respectively, if the direction of rotation is clockwise or counter-clockwise, otherwise state S3 is followed with no rotation Likewise, if branch 1910 was followed based upon the fact that no user input was applied to e-book 100, then if e-book 100 was rotated then states S4 or S5 will be reached, otherwise, state S6.

For example, e-book 100 is presenting page N of Book I on the primary display, then if a user input is applied (such as selecting a word on page N), and if e-book 100 is rotated counterclockwise, then state S2 can be reached which can correspond to providing a definition for the selected word. However, if e-book 100 is rotated clockwise then state S1 is reached which can correspond to a new page being displayed, such as a next page Page N+1. Of course, since there are at least 3 possible axes of rotation and the movements applied by the user can be either simple or compound, the total number of possible end states S can be quite large and depend upon the user's preferences.

Figure 20:
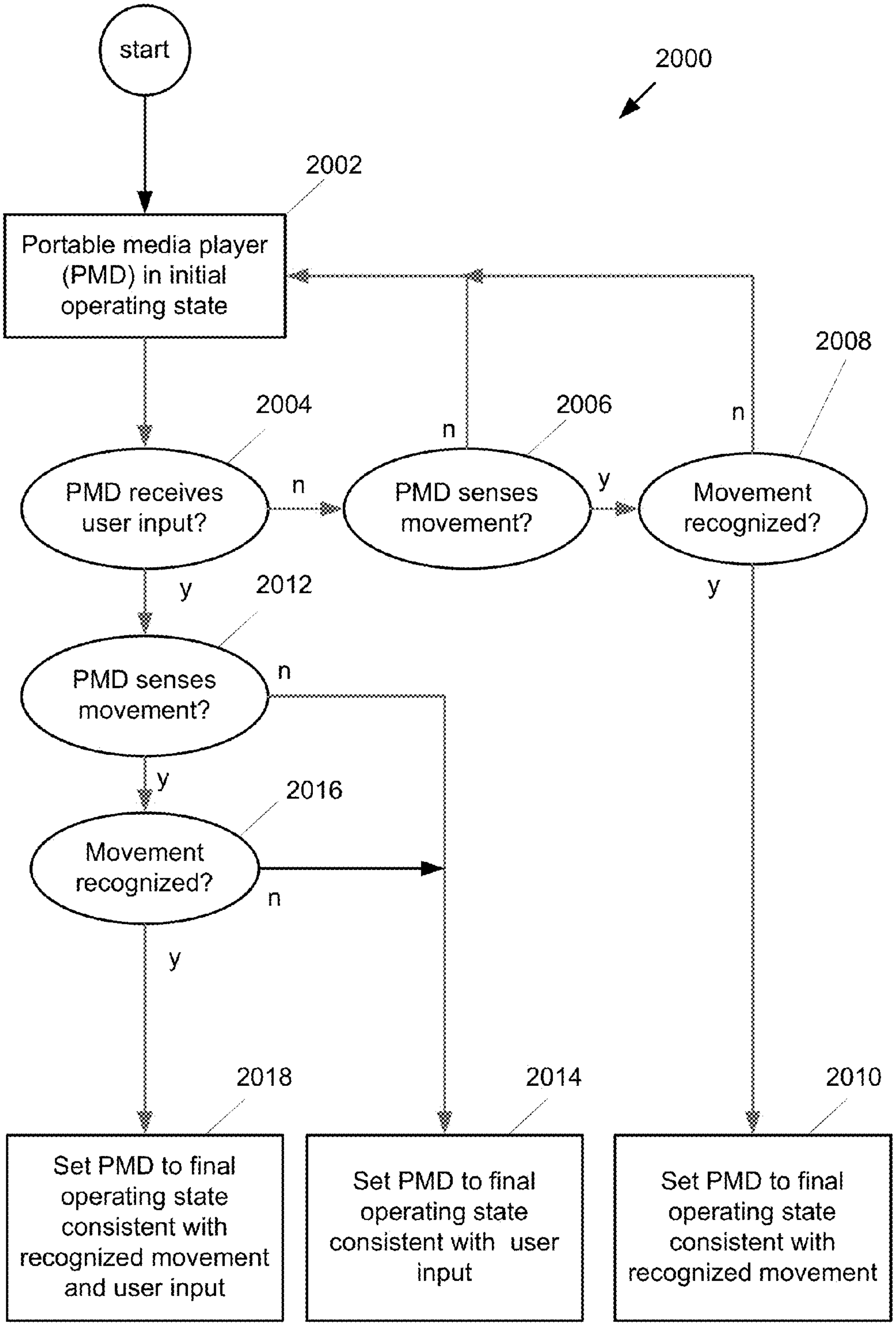
FIG. 20 shows a flow diagram illustrating process for using a controlled movement to modify an operating state of a portable media device (PMD) in accordance with the described embodiments.

FIG. 20 shows a flow diagram illustrating process 2000 for using a controlled movement to modify an operating state of a portable media device (PMD) in accordance with the described embodiments. Process 2000 can begin at 2010 with the PMD operating in an initial operating state. For example, if the PMD is configured as an e-book, then the initial operating state can be that of displaying a page from a book whose content is stored in the e-book. At 2004, a determination is made whether or not the PMD has received a user input. Again, using the example of the e-book, the user input could take the form of selecting a word, phrase, or sentence from the page currently displayed by the e-book. If no user input is received, then at 2006 a determination is made whether or not the PMD senses a movement. For example, the movement can be any of a number of movements provided by a user of the PMD such as rotating about one or more axes, translation in one or more directions, and so on. If the PMD does not sense any motion, then no action is taken and the PMD remains in the initial operating state. However, if the PMD senses movement at 2006, then at 2008, a determination is made whether or not the movement is recognized. By recognized it is meant that the sensed movement can be associated with one of a number of pre-determined movements established by the PMD as those movements consistent with an action or actions to be taken that can alter a current operating state of the PMD. If the sensed movement is not recognized, then no action is taken and the PMD remains in the initial state. However, if the movement is recognized, then the PMD is set to a final operating state consistent with the recognized movement at 2010. For example, if the PMD is configured to operate as a dual display e-book displaying page N on the primary display, and the recognized movement is a simple rotation, then the final operating state will be consistent with updating the secondary display to present a table of contents for the book.

Turning back to 2004, if it had been determined that a user input was received, then at 2012 then a determination is made whether or not the PMD senses movement. If no movement is sensed, then the PMD is set to a final operating state consistent with the received user input at 2014. However, if the PMD senses movement, then at 2016, a determination is made whether or not the sensed movement is recognized (along the lines of 2008). If the sensed movement is not recognized, then control is passed directly to 2014 and the PMD is set to the final operating state consistent with the user input. However, if the movement is recognized, then the PMD is set to an operating state consistent with both the recognized movement and the user input at 2018. For example, again using the dual display e-book example, if the initial condition of the dual display e-book is displaying page N of a book on the primary display and the user input is selecting a word on that page, and the recognized movement is the simple rotation, then the final operating state of the e-book is consistent with the secondary display updated to present a page from a dictionary that includes at least one definition of the selected word.

It should be noted that the final operating state can also be modified based upon the context of any material being presented by the PMD as part of the initial operating state. For example, if the PMD takes the form of an image viewer configured for displaying images in the form of still pictures, then the final operating state will also be consistent with the context of still images. Alternatively, if the PMD takes the form of a dual display e-book, then the context of the textual data presented by the primary display will have an effect on the final operating state. For example, the context of the textual data presented can be that of a book, magazine, the language of the textual data, and so on. Therefore, the particular context of the presented data will affect the final operating state. For example, if the context of the textual data is a language that reads left to right, then the final operating state will be consistent with reading textual data left to right.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method for modifying an operation of a portable media device, the portable media device having a processor, a user input device, a sensor, and at least a first display and a second display mounted in a single piece housing such that only one of the displays is presented at a time, the method comprising:

displaying visual content on the first display;

detecting a rotation of the portable media device with the sensor;

determining an axis of rotation of the portable media device by the processor from at least three recognized axes of rotation and a direction of rotation;

receiving a user input through the user input device, separate from the sensor at the portable media device, wherein the user input includes a selection of a portion of the displayed visual content on the first display; and modifying the operation of the portable media device by the processor based upon the determined axis of rotation and the direction of rotation and the received user input, wherein modifying the operation of the portable media device comprises:

updating content presented by the second display, wherein when the portable media device is an electronic book arranged to present visual content that includes text using electronic ink, then receiving the user input through the user input device comprises receiving a selected portion of the text, wherein when the visual content that includes the text being presented on the first display is a page from a book stored in the electronic book and the direction of rotation is a first direction of rotation, then the updating content presented by the second display comprises:

updating the content presented by the second display as a dictionary page presenting at least one definition of a selected word in the selected portion of the text; and presenting the dictionary page after completion of the rotation of the electronic book.

2. The method as recited in claim 1, wherein the modifying the operation is carried out only if an angle of rotation of the portable media device is greater than a critical angle of rotation.

3. The method as recited in claim 1, wherein when the direction of rotation is a second direction of rotation different from the first direction of rotation, then the updating content presented by the second display comprises:

updating the content presented by the second display as an annotation page arranged to receive information; and presenting the annotation page after completion of the rotation of the electronic book.

4. Computer readable medium for storing in tangible form computer instructions executable by a processor for modifying an operation of a portable media device, the portable media device having the processor, a sensor, a user input device and at least a first display and a second display mounted back to back in a single piece housing such that only one of the displays is presented at a time, the computer readable medium comprising:

computer code for detecting when the portable media device is being rotated;

computer code for determining an axis of rotation of the portable media device from at least three recognized axes of rotation and a direction of rotation;

computer code for displaying text on the first display;

computer code for receiving an input event through a user input device, wherein the input event selects a portion of the displayed text; and computer code for modifying the operation of the portable media device based upon the determined axis of rotation and the direction of rotation and the received input event, wherein the computer code for modifying the operation of the portable media device comprises:

computer code for updating content presented by the second display, wherein the portable media device is an electronic book arranged to present visual content using electronic ink, wherein when the visual content being presented on the first display is a page from a book stored in the electronic book and the direction of rotation is a first direction of rotation, then the computer code for updating content presented by the second display comprises:

computer code for updating the content presented by the second display as a dictionary page presenting at least one definition of a selected word in the selected portion of the displayed text; and computer code for presenting the dictionary page after completion of the rotation of the electronic book.

5. The computer readable medium as recited in claim 4, wherein the modifying the operation is carried out only if an angle of rotation of the portable media device is greater than a critical angle of rotation.

6. The computer readable medium as recited in claim 4, wherein when the direction of rotation is a second direction of rotation different from the first direction of rotation, then the computer code for updating content presented by the second display comprises:

computer code for updating the content presented by the second display as an annotation page arranged to receive information;

computer code for presenting the annotation page after completion of the rotation of the electronic book; and computer code for receiving information at the annotation page.

7. A method of operating a portable media device, the portable media device having first and second displays mounted back to back in a housing, the method comprising:

displaying page N of a book on the first display;

while displaying page N of the book on the first display and with at least one sensor, detecting rotation of the portable media device around a first axis of rotation;

in response to detecting rotation of the portable media device around the first axis of rotation, displaying, on the second display, content other than page N, page N+1, or page N−1 of the book; and determining whether the rotation of the portable media device around the first axis of rotation is in a first direction or is in a second direction, wherein displaying, on the second display, content other than page N, page N+1, or page N−1 of the book comprises:

whenever the rotation of the portable media device around the first axis of rotation is in the second direction, displaying an annotation pad on which a user can makes notes on the second display.

8. The method defined in claim 7 further comprising:

while displaying page N of the book on the first display and with the at least one sensor, detecting rotation of the portable media device around a second axis of rotation, wherein the second axis is substantially perpendicular to the first axis;

determining whether the rotation of the portable media device around the second axis of rotation is in a first direction or is in a second direction;

whenever the rotation of the portable media device around the second axis of rotation is in the first direction, displaying page N+1 of the book on the second display; and whenever the rotation of the portable media device around the second axis of rotation is in the second direction, displaying page N−1 of the book on the second display.

9. The method defined in claim 7, wherein displaying, on the second display, content other than page N, page N+1, or page N−1 of the book comprises:

whenever the rotation of the portable media device around the first axis of rotation is in the first direction, displaying a table of contents for the book on the second display.

10. A method of operating a portable media device, the portable media device having first and second displays mounted back to back in a housing, the method comprising:

displaying page N of a book on the first display;

while displaying page N of the book on the first display and with at least one sensor, detecting rotation of the portable media device around a first axis of rotation;

in response to detecting rotation of the portable media device around the first axis of rotation, displaying, on the second display, content other than page N, page N+1, or page N−1 of the book;

prior to detecting rotation of the portable media device around the first axis of rotation, receiving a user selection of at least one word from page N of the book; and determining whether the rotation of the portable media device around the first axis of rotation is in a first direction or is in a second direction, wherein displaying, on the second display, content other than page N, page N+1, or page N−1 of the book comprises:

whenever the rotation of the portable media device around the first axis of rotation is in the second direction, displaying a thesaurus entry of the at least one selected word on the second display.

11. The method defined in claim 10, wherein displaying, on the second display, content other than page N, page N+1, or page N−1 of the book comprises:

whenever the rotation of the portable media device around the first axis of rotation is in the first direction, displaying a dictionary definition of the at least one selected word on the second display.

12. A method of operating a portable media device, the portable media device having first and second displays mounted back to back in a housing, the method comprising:

displaying page N of a book on the first display;

while displaying page N of the book on the first display and with at least one sensor, detecting rotation of the portable media device around a first axis of rotation;

in response to detecting rotation of the portable media device around the first axis of rotation, displaying, on the second display, content other than page N, page N+1, or page N−1 of the book;

prior to detecting rotation of the portable media device around the first axis of rotation, determining whether or not a user selection of at least one word from page N of the book has been received; and determining whether the rotation of the portable media device around the first axis of rotation is in a first direction or is in a second direction, wherein displaying, on the second display, content other than page N, page N+1, or page N−1 of the book comprises:

whenever it is determined that no user selection of at least one word from page N of the book has been received and whenever the rotation of the portable media device around the first axis of rotation is in the first direction, displaying a table of contents for the book on the second display;

whenever it is determined that no user selection of at least one word from page N of the book has been received and whenever the rotation of the portable media device around the first axis of rotation is in the second direction, displaying an annotation pad on which a user can makes notes on the second display;

whenever it is determined that a user selection of at least one word from page N of the book has been received and whenever the rotation of the portable media device around the first axis of rotation is in the first direction, displaying a dictionary definition of the at least one selected word on the second display; and whenever it is determined that a user selection of at least one word from page N of the book has been received and whenever the rotation of the portable media device around the first axis of rotation is in the second direction, displaying a thesaurus entry of the at least one selected word on the second display.

13. A method of operating a portable media device, the portable media device having first and second displays mounted back to back in a housing, the method comprising:

displaying page N of a book on the first display;

while displaying page N of the book on the first display and with at least one sensor, detecting rotation of the portable media device around a first axis of rotation; and in response to detecting rotation of the portable media device around the first axis of rotation, displaying, on the second display, content other than page N, page N+1, or page N−1 of the book, wherein displaying, on the second display, content other than page N, page N+1, or page N−1 of the book in response to detecting rotation of the portable media device around the first axis of rotation, displaying comprises displaying, on the second display, at least one of:

an interactive annotation pad that receives at least one of user notes and user comments;

a dictionary definition of at least one user-selected word; and a thesaurus entry associated with at least one user-selected word.

14. A method of operating a portable media device, the portable media device having first and second displays mounted back to back in a housing, the method comprising:

displaying page N of a book on the first display;

while displaying page N of the book on the first display and with at least one sensor, detecting rotation of the portable media device around a first axis of rotation;

in response to detecting rotation of the portable media device around the first axis of rotation, displaying, on the second display, content other than page N, page N+1, or page N−1 of the book;

prior to detecting rotation of the portable media device around the first axis of rotation, receiving a user selection of at least one word from page N of the book; and determining whether the rotation of the portable media device around the first axis of rotation is in a first direction or is in a second direction, wherein displaying, on the second display, content other than page N, page N+1, or page N−1 of the book comprises:

whenever the rotation of the portable media device around the first axis of rotation is in the first direction, displaying a dictionary definition of the at least one selected word on the second display.

* * * * *